April 9, 1968  P. A. GLORIOSO  3,377,542

VOLTAGE REGULATION CIRCUIT UTILIZING GRADUAL SLOPE CONTROL

Filed April 16, 1965

INVENTOR.
PAUL A. GLORIOSO
BY
Owen & Owen
ATTORNEYS

United States Patent Office 3,377,542
Patented Apr. 9, 1968

3,377,542
VOLTAGE REGULATION CIRCUIT UTILIZING GRADUAL SLOPE CONTROL
Paul A. Glorioso, Amherst, Ohio, assignor to Gregory Industries, Inc., Lorain, Ohio, a corporation of Michigan
Filed Apr. 16, 1965, Ser. No. 448,737
14 Claims. (Cl. 321—18)

ABSTRACT OF THE DISCLOSURE

A voltage regulation circuit incorporates gradual slope control and limits maximum current in the event of a malfunction. The circuit is particularly useful in charging capacitors for capacitor discharge welding apparatus. An auxiliary circuit including an auxiliary power source uses a control capacitor for controlling the output of the main power source connected to the capacitor to be charged. A second capacitor in series with the control capacitor regulates the time in which the control capacitor reaches its operating charge. The main power source takes over the charging of the control capacitor when its output exceeds the output of the auxiliary power source. In the event of a malfunction, such as a short in the capacitor being charged, the capacitor cannot be charged above the output of the auxiliary power source. Finally, the circuit of the invention utilizes a transistor and a variable resistor for partially draining the control capacitor to control the voltage to which the main capacitor is charged.

---

This invention relates to improved voltage regulation and more particularly to an improved voltage regulation circuit for controlling charging current to a capacitor used as a power source for a stud welding tool. The circuit increases the charging voltage at a progressively increasing rate until a maximum current is reached, and also limits maximum current to a safe value in the event of a short circuit of the capacitor or other malfunction of the component to which the voltage is supplied.

A voltage regulation circuit according to the invention has particular utility for charging capacitors and has been found to be effective when used with stud welding apparatus in which capacitors constitute the power source and must be recharged to a predetermined voltage after each weld and consequent discharge of the capacitors. The new voltage regulation circuit has a slope control feature by means of which the voltage for charging the capacitor builds up gradually at an increasing rate. This enables the use of smaller diodes and similar components in the circuitry or enables a bigger safety factor to be achieved for components of a given size, such safety factor being necessary for variations in line voltage, for example. Resistors could be used to achieve a gradual voltage buildup in the circuit but a high resistance would be necessary and a large $I^2R$ loss would result. The heat incident to an $I^2R$ loss must be dissipated, which is often a problem, and substantial power loss would also occur.

The new voltage regulation circuit has another important feature in that the maximum voltage applied across the capacitor is limited in the event of a short circuit or similar malfunction. Consequently, it is impossible to obtain high current in the equipment in the event of such a mishap.

It is, therefore, a principal object of the invention to provide an improved voltage regulation circuit incorporating gradual slope control for the voltage rise.

Another object of the invention is to provide an improved voltage regulation circuit in which maximum current is limited in the event of a malfunction.

Figure 1:
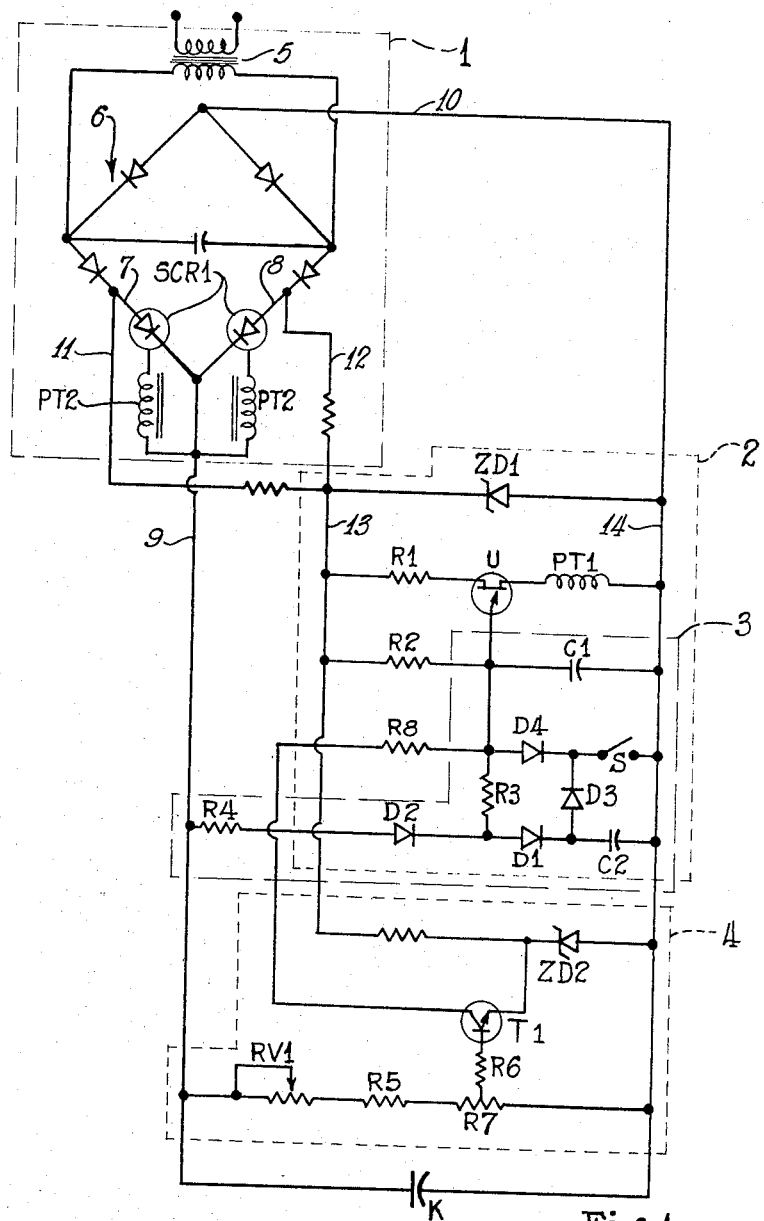
Figure 2:
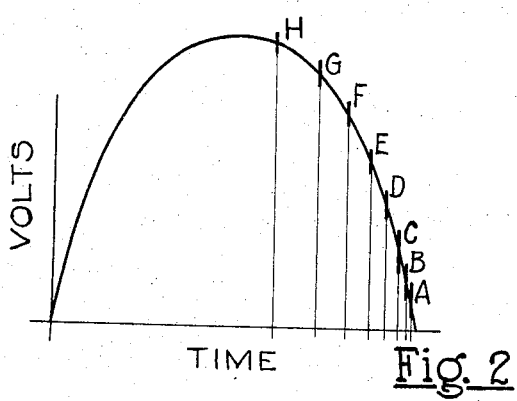

Numerous other objects and advantages of the invention will be apparent from the following detailed description of a preferred embodiment thereof, reference being made to the acompanying drawing, in which:

FIG. 1 is a diagram of a voltage regulation circuit embodying the invention; and FIG. 2 is a representation of rectified voltage as a function of time for a half cycle, with positions marked thereon at which power is supplied.

Referring to the drawing, a capacitor as can be used as a source of power in a welding circuit is designated K and can be incorporated in any suitable welding circuit, such as that shown in Glorioso Patent 3,136,880. Several capacitors are usually used by they are treated in the following discussion as one. In such a circuit, the capacitor is periodically discharged between a workpiece and a welding stud spaced slightly therefrom in order to establish a main welding arc and melt small quantities of metal on the stud and workpiece. After an appropriate length of time measured in fractions of a second, the stud and workpiece are brought together and the metal is allowed to solidify in order to complete the weld. The capacitor then must be recharged before the next weld is made.

The voltage regulation circuit for charging the capacitor or other electrical component can be described in terms of four portions, some of which overlap. These include a power source portion shown within broken lines designated 1, a first voltage regulation portion shown within broken lines designated 2, a second voltage regulation portion shown within broken lines designated 3, and third voltage regulation portion shown within broken lines designated 4. In the embodiment shown, the power source portion 1 includes an AC transformer 5 and a full wave rectifier 6. The rectifier 6 has two semiconductor or silicon controlled rectifiers, each designated SCR1, in each of two output legs 7 and 8 of the rectifier 6 with the SCR's keyed through secondary windings, each designated PT2, of a pulse transformer. Power is supplied to main leads 9 and 10 only when the rectifiers are keyed. Secondary leads 11 and 12 are connected to the output legs 7 and 8 of the rectifier 6 and ahead of the silicon controlled rectifiers SCR1 such that power is always supplied to these leads regardless of the condition of the rectifiers SCR1. A fully rectified, secondary voltage is thereby applied between leads 13 and 14, which voltage is maintained constant by a Zener diode ZD1. A resistance R1, a unijunction transistor U, and a primary winding PT1 of the pulse transformer are connected between the leads 13 and 14. A capacitor C1 is connected to the emitter of the unijunction transistor U and to the lead 14. A second resistor R2 is connected to the lead 13 and the emitter of the unijunction transistor U. The capacitor C1 can be charged at a rate determined by the resistance R2 until it reaches a value at which it causes the unijunction transistor U to be keyed or to conduct. When this occurs, a circuit is completed through the primary winding PT1 so that the capacitor C1 discharges therethrough to induce a pulse in the secondary windings PT2. This pulse keys or fires one of the silicon controlled rectifiers SCR1. The keyed rectifier then conducts to complete a circuit through the main leads 9 and 10 to charge the capacitor K. Without further variation of the charging time of the capacitor C1, the capacitor K would be charged to a predetermined value at which it would remain. If the capacitor C1 required a half-cycle or more to key the unijunction transistor U, then a voltage would never appear across the leads 9 and 10. On the other hand, if the time required for the capacitor C1 to reach the firing voltage decreases, the controlled rectifiers SCR1 are keyed earlier during each half-wave, thereby increasing the voltage across the leads 9 and 10 up to the maximum of the power source, 120 volts, for example.

To vary the voltage across the leads 9 and 10 and to cause the voltage to rise during each half wave cycle, a second capacitor C2 is located in parallel with the capacitor C1, being connected through a third resistance R3. At the beginning of a charging cycle for the capacitor K, and with both of the capacitors C1 and C2 discharged, the capacitor C1 charges at its slowest rate since a large part of the power or current is diverted to the capacitor C2 through the resistance R3. Since the capacitor C2 is discharged at the beginning of cycle, maximum current is then diverted and the capacitor C1 is charged slowly to key the unijunction transistor U and cause the controlled rectifiers SCR1 to conduct very near the end of the half-wave cycle.

At the end of each half-wave cycle, the voltage across the leads 13 and 14 drops to zero and the capacitor C1 discharges. However, the capacitor C2 retains its charge, being prevented from discharging by a diode D1. Hence, after each half-wave cycle, the capacitor C1 discharges substantially completely whereas the capacitor C2 retains its charge which is built up more during the next half-wave cycle. Each time the charge on the capacitor C2 increases, less current is diverted to it from the capacitor C1 with the result that the capacitor C1 charges faster, thereby keying the unijunction transistor U more rapidly and causing the rectifiers SCR1 to conduct sooner. The voltage thereby builds up on the capacitor K as the controller rectifiers SCR1 conduct earlier in the cycle toward the peak voltage thereof. Several points at which the rectifiers SCR1 conduct, when controlled by the first voltage regulation portion 2, are designated A–C in FIG. 2.

When the charges on the capacitors C1 and C2 reach substantially equal values, taking into account the additional resistance R3 for the capacitor C2, then the capacitor C1 would charge to the keying or firing value in a substantially constant amount of time and the charge on the capacitor K would then be constant. However, the values of the capacitors and resistance are selected such that, before the charges on the capacitors C1 and C2 become substantially equal, the rectifiers SCR1 are keyed sufficiently early that the voltage across the leads 9 and 10 exceeds the voltage across the Zener diode ZD1 and the second control circuit 3 then takes over. The capacitor C1 is then charged through a resistor R4, a diode D2, and the resistor R3. Since this voltage is higher than that across the lines 13 and 14, the capacitor C1 charges at a faster rate to cause the rectifiers SCR1 to conduct earlier and thereby continue to increase the voltage across the lines 9 and 10. By now the charge on the capacitor C2 will have reached the firing voltage of the unijunction transistor U, so that the capacitor C2 substantially has little affect on the remainder of the voltage regulation.

As the capacitor C1 charges more rapidly and the voltage across the capacitor C1 through the resistor R4 increases, the capacitor C1 reaches the necessary keying charge faster and fires the unijunction transistor U earlier so that the output voltage continues to rise, the rectifiers SCR1 conducting at points designated D–H in FIG. 2. When a predetermined voltage is reached, as designated by the point H, for example, this voltage being determined by a variable resistor RV1, the third control circuit 4 takes over. The voltage is applied through the variable resistance RV1, resistances R5 and R6, a voltage divider resistance R7, and to the base of a transistor T1. When the base voltage of transistor T1 exceeds the emitter voltage of the transistor T1, which is set by a Zener diode ZD2, the transistor T1 starts to conduct. Current from the capacitor C1 is then drained through a resistance R8, the transistor T1, and the Zener diode ZD2, thereby bleeding the capacitor charge and increasing its time constant or the time required to build the charge to the value required to fire the unijunction transistor U. Hence, the charge applied to the capacitor K is limited by the drain of the capacitor C1 through the transistor T1, with the capacitor K then being held at substantially its predetermined charge by the control achieved with the transistor T1.

When the welding cycle is started, a switch S is closed to discharge the capacitor C2 through a diode D3 and to discharge the capacitor C1 through a diode D4. The use of the diodes D3 and D4 simply enable the one switch S to be used rather than two. The discharge of the capacitor C2 enables it to start again at zero charge during the next recharging cycle. The rectifiers SCR1 are off at this time with the capacitors C1 and C2 discharged and, hence, the power source is isolated from the capacitor K during the welding cycle.

While one of the rectifiers SCR1 could be used in the main lead 9 rather than two in the output legs 7 and 8, actually the two smaller ones cost less than a single larger one which would be needed to handle current from both legs. Further, since each of the rectifiers SCR1 controls only every other half cycle, they are certain to shut off after a half cycle. If one rectifier were used for each half cycle, there is a possibility that it would not shut off at the end of each half cycle and prior to the initiation of the next half cycle, since, while the voltage at this point theoretically drops to zero, in practice, this is not always true and the voltage, in fact, may not reach zero.

It will be seen from the above description that the voltage control operates in three stages. In the first stage, designated by the broken line 2, the voltage rises as the charge on the capacitor C2 increases. When the voltage across the lines 9 and 10 exceeds the voltage controlled by the zener diode ZD1, the second stage indicated by the broken lines 3 takes over and the capacitor C1 is charged through the resistance R4, the diode D2, and the resistance R3, at which time the voltage again increases as the capacitor C1 uses the voltage it controls to increase its own charge. However, if the capacitor K should be shorted, for example, the voltage applied thereto will never exceed the maximum established by the control circuit 2 because the short circuit will prevent the voltage of the second stage to exceed that across the leads 13 and 14. The components of the first stage are selected, therefore, to limit the voltage controlled by this stage to a maximum of twenty-five to thirty volts, for example. Finally, when the output voltage reaches a predetermined level as controlled by the variable resistance RV1, the fourth stage designated by the broken lines 4 takes over and controls the drain of the capacitor C1 thereby to control the time constant and the voltage established across the leads 9 and 10, the voltage being lower as the drain increases and higher as the drain decreases through the transistor T1. During the welding cycle or other operation discharging the capacitor K, the switch S is closed and the capacitors C1 and C2 are completely discharged so as to be ready for the next charging cycle.

Various modifications of the above described embodiment of the invention will be apparent to those skilled in the art, and it is to be understood that such modifications can be made without departing from the scope of the invention if they are within the spirit and the tenor of the accompanying claims.

What I claim is:

1. A voltage regulation circuit comprising a main power source including a full-wave rectifier, a pair of semiconductor controlled rectifiers in the output legs of said full-wave rectifier for controlling flow of current therethrough, a pair of secondary windings of a pulse transformer connected to the gates of said semiconductor controlled rectifiers for rendering said rectifiers conductive, a second power source established by leads electrically connected to said output legs ahead of said semiconductor controlled rectifiers so as to be unaffected by the operation thereof, a first zenor diode connected to said second power source to establish a constant voltage, a unijunction transistor and a primary winding of the pulse transformer connected in series to said second power source, a first capacitor connected through the emitter of said unijunction transistor and said primary winding and also connected to said second power source, a series-connected second capacitor and a resistor connected in parallel with said first capacitor to said second power source, circuit means connecting said capacitors to said main power source to charge said capacitors by output voltage of said main power source when said output voltage exceeds the voltage of said second power source, a transistor, means including a variable resistor connecting the base of said transistor to said main power source, a second zener diode connected to said transistor, means connecting said transistor to said first capacitor to partly drain said first capacitor when said transistor is conducting when voltage applied to the base exceeds a predetermined value as set by said variable resistor, whereby the maximum voltage output of said main power source is limited by the current drained from said first capacitor by said transistor.

2. A voltage regulation circuit comprising a main power source including a full-wave rectifier, a pair of semiconductor controlled rectifiers in the output legs of said full-wave rectifier for controlling flow of current therethrough, a pair of secondary windings of a pulse transformer connected to the gates of said semiconductor controlled rectifiers for rendering said rectifiers conductive, a second power source established by leads electrically connected to said output legs ahead of said semiconductor controlled rectifiers so as to be unaffected by the operation thereof, a first zener diode connected to said second power source to establish a constant voltage, a unijunction transistor and a primary winding of the pulse transformer connected in series to said second power source, a first capacitor connected through the emitter of said unijunction transistor and said primary winding and also connected to said second power source, a series-connected second capacitor and a resistor connected in parallel with said first capacitor to said second power source, and circuit means connecting said capacitors to said main power source to charge said capacitors by output voltage of said main power source when said output voltage exceeds the voltage of said second power source.

3. A voltage regulation circuit comprising a main power source including a full-wave rectifier, a pair of semiconductor controlled rectifiers in the output legs of said full-wave rectifier for controlling flow of current therethrough, a pair of secondary windings of a pulse transformer connected to the gates of said semiconductor controlled rectifiers for rendering said rectifiers conductive, a second power source established by leads electrically connected to said output legs ahead of said semiconductor controlled rectifiers so as to be unaffected by the operation thereof, a unijunction transistor and a primary winding of the pulse transformer connected in series to said second power source, a first capacitor connected through the emitter of said unijunction transistor and said primary winding and also connected to said second power source, and a series-connected second capacitor and a resistor connected in parallel with said first capacitor to said second power source.

4. A voltage regulation circuit comprising power means providing a source of full-wave rectified current, a unijunction transistor, switch means for controlling said power means, means responsive to said unijunction transistor for closing said switch means when said unijunction transistor is fired, a capacitor connected to said unijunction transistor to fire same when the charge on said capacitor reaches a predetermined value, a second capacitor and a resistance in parallel with said first capacitor, means preventing said second capacitor from discharging upon each cycle of current from the power means whereby said second capacitor accumulates a charge, constant voltage means for maintaining constant voltage across said capacitors and said unijunction transistor, circuit means in parallel with said constant voltage means connecting said capacitors to said power means for placing a higher voltage across said capacitors when the voltage output of said power means exceeds that of said constant voltage means, and means including transistor means for draining part of the charge from said first capacitor when the main voltage reaches a predetermined value.

5. A voltage regulation circuit comprising power means providing a source of full-wave rectified current, a unijunction transistor, switch means for controlling said power means, means responsive to said unijunction transistor for closing said switch means when said unijunction transistor is fired, a capacitor connected to said unijunction transistor to fire same when the charge on said capacitor reaches a predetermined value, a second capacitor and a resistance in parallel with said first capacitor, means preventing said second capacitor from discharging upon each cycle of current from the power means whereby said second capacitor accumulates a charge, voltage control means for maintaining constant voltage across said capacitors and said unijunction transistor independently of said switch means, means including transistor means for draining part of the charge from said first capacitor when the main voltage reaches a predetermined value.

6. A voltage regulation circuit comprising a source of rectified power, a unijunction transistor, switch means for controlling said power source, means responsive to said unijunction transistor for closing said switch means when said unijunction transistor is fired, a capacitor connected to said unijunction transistor to fire same when the charge on said capacitor reaches a predetermined value, a second capacitor and a resistance in parallel with said first capacitor, means preventing said second capacitor from discharging upon each cycle of current from the power source whereby said second capacitor accumulates a charge, and means connecting said capacitors to said power source independently of said switch means.

7. A voltage regulation circuit for controlling the voltage output of a source of full-wave rectified current comprising switch means for controlling said source, a first capacitor, actuating means connected across said capacitor for closing said switch means when said capacitor is discharged across said actuating means, additional switch means connected between said first capacitor and said actuating means, said second switch means normally being open but being closed when the charge on said capacitor reaches a predetermined value, a second capacitor located in parallel with said first capacitor, an additional voltage source for cyclically charging said capacitors, means preventing said second capacitor from discharging when the power from said additional voltage source drops, circuit means connecting said main voltage source to said capacitors for placing a higher voltage across said capacitors when the voltage output from said main voltage source exceeds that of said additional voltage source, a transistor and a zener diode connected across said first capacitor for partially draining said first capacitor when the charge of said transistor exceeds that of said zener diode, and additional circuit means including variable resistance means connecting said main voltage source to said transistor, said variable resistance controlling the voltage at which said transistor partially drains said first capacitor.

8. A voltage regulation circuit for controlling the voltage output of a main source of full-wave rectified current comprising switch means for controlling said source, a first capacitor, actuating means connected across said capacitor for closing said switch means when said capacitor is discharged across said actuating means, additional switch means connected between said first capacitor and said actuating means, said additional switch means normally being open but being closed when the charge on said capacitor reaches a predetermined value, a second capacitor located in parallel with said first capacitor, an additional voltage source for cyclically charging said capacitors, means preventing said second capacitor from discharging when the power from said additional voltage source drops, and circuit means connecting said main voltage source to said capacitors for placing a higher voltage across said capacitors when the voltage output from said main voltage source exceeds that of said additional voltage source.

9. A voltage regulation circuit for controlling the voltage output of a source of full-wave rectified current comprising switch means for controlling said source, a first capacitor, actuating means connected across said capacitor for closing said switch means when said capacitor is discharged across said actuating means, additional switch means connected between said first capacitor and said actuating means, said additional switch means normally being open but being closed when the charge on said capacitor reaches a predetermined value, a second capacitor located in parallel with said first capacitor, an additional voltage source for cyclically charging said capacitors, and means preventing said second capacitor from discharging when the power from said additional voltage source drops.

10. A voltage regulation circuit comprising a main source of pulsating unidirectional power to be regulated, switch means in series with said source, means for operating said switch means at varying points on the half-wave cycle of the power source, said operating means comprising a constant power source, a first and a second capacitor in parallel and connected to said constant power source, means for preventing the second capacitor from discharging when the power of the constant source is off, means responsive to the charge on the first capacitor for controlling said switch means, second circuit means connecting said main power source across said capacitors to apply higher voltage across said capacitors when the voltage of the main power source exceeds the voltage of the constant power source, and means for partly draining the charge on said first capacitor when the voltage across said main power source reaches a predetermined value.

11. A voltage regulation circuit comprising a main source of pulsating unidirectional power to be regulated, switch means in series with said source, means for operating said switch means at varying points on the half-wave cycle of the power source, said operating means comprising a constant power source, a first and a second capacitor in parallel and connected to said constant power source, means for preventing the second capacitor from discharging when the power of the constant source is off, means responsive to the charge on the first capacitor for controlling said switch operating means, and second circuit means connecting said main power source across said capacitors to apply higher voltage across said capacitors when the voltage of the main power source exceeds the voltage of the constant power source.

12. A voltage regulation circuit comprising a main source of pulsating unidirectional power to be regulated, switch means in series with said source, means for operating said switch means at varying points on the half-wave cycle of the power source, said operating means comprising a constant power source, a first and a second capacitor in parallel and connected to said constant power source, means for preventing the second capacitor from discharging when the power of the constant source is off, and means responsive to the charge on the first capacitor for controlling said switch means.

13. A voltage regulation circuit for charging a main capacitor comprising a main power source, a main capacitor to be charged connected to said main power source, switch means for controlling said main power source, an auxiliary power source, a control capacitor and switch-actuating means connected with said auxiliary power source, said control capacitor actuating said switch-actuating means to operate said switch means when reaching a predetermined charge, means connecting said control capacitor to said main power source in parallel with said main capacitor to cause said control capacitor to charge faster when the voltage of said main power source exceeds that of said auxiliary power source, and means for draining part of the charge from said control capacitor when the voltage output of said main power source reaches a predetermined value.

14. A voltage regulation circuit for charging a main capacitor comprising a main power source, a main capacitor to be charged connected to said power source, switch means for controlling said main power source, an auxiliary power source, a control capacitor and switch-actuating means connected with said auxiliary power source, said control capacitor actuating said switch-actuating means to close said switch means when reaching a predetermined charge, and means connecting said control capacitor to said main power source in parallel with said main capacitor to cause said control capacitor to charge faster when the voltage of said main power source exceeds that of said auxiliary power source.

References Cited

UNITED STATES PATENTS

| 3,345,558 | 10/1967 | Christian | 323—75 |
| 3,095,534 | 6/1963 | Cockrell | 321—19 |
| 3,260,962 | 7/1966 | Drapper | 331—111 |
| 3,262,045 | 7/1966 | Hauck | 321—16 |
| 3,281,638 | 10/1966 | Crawford | 321—16 X |
| 3,289,104 | 11/1966 | McClay et al. | 331—111 |
| 3,304,487 | 2/1967 | McCaskey | 321—18 X |

JOHN F. COUCH, *Primary Examiner.*

G. GOLDBERG, *Assistant Examiner.*